No. 740,625. PATENTED OCT. 6, 1903.
J. P. BURLINGAME.
BALL FLOAT.
APPLICATION FILED NOV. 12, 1902.
NO MODEL.
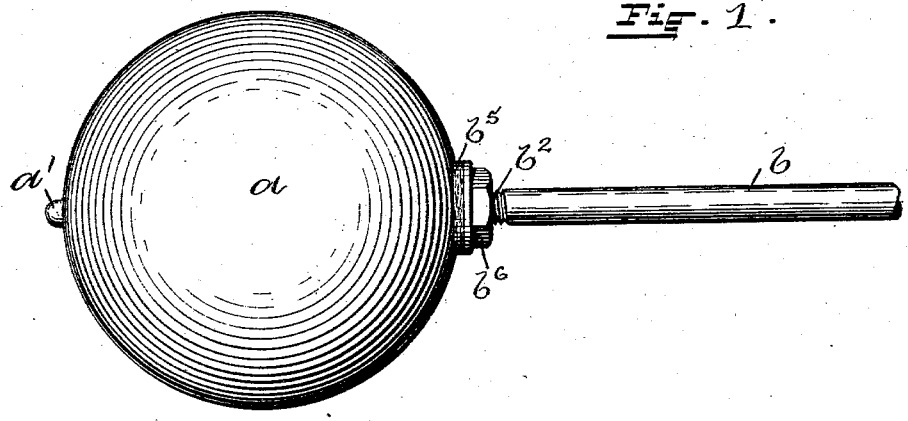
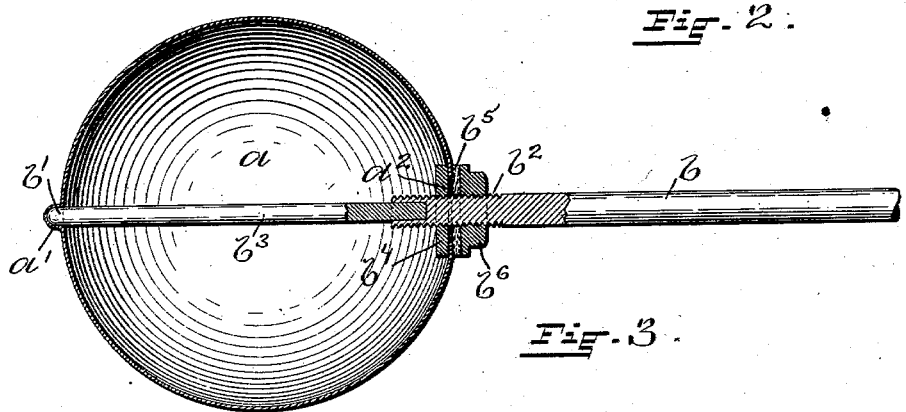
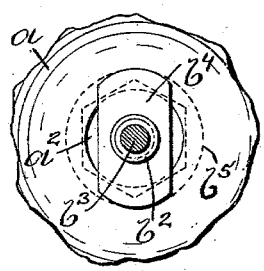
WITNESSES:
Ada E. Fagerty
Chas. H. Luther Jr.
INVENTOR:
Joseph P. Burlingame
by Joseph A. Miller & Co.
ATTORNEYS.

No. 740,625. Patented October 6, 1903.

UNITED STATES PATENT OFFICE.

JOSEPH P. BURLINGAME, OF LAKEWOOD, RHODE ISLAND, ASSIGNOR OF ONE-HALF TO JENNIE E. FIELD, OF LAKEWOOD, RHODE ISLAND.

BALL-FLOAT.

SPECIFICATION forming part of Letters Patent No. 740,625, dated October 6, 1903.

Application filed November 12, 1902. Serial No. 130,978. (No model.)

*To all whom it may concern:*

Be it known that I, JOSEPH P. BURLINGAME, a citizen of the United States, residing at Lakewood, in the county of Kent and State of Rhode Island, have invented a new and useful Improvement in Ball-Floats, of which the following is a specification.

This invention has reference to an improvement in the ball-floats usually connected with the valve controlling the water-supply to cisterns, flushing-tanks for water-closets, and other reservoirs.

Ball-floats consists usually of a hollow metal sphere which is provided with a lever connected with the water-supply valve. The ball acts to lift the end of the lever secured to the ball as the level of the water rises and to depress the end of the lever as the level of the water is lowered.

The reliability of the device depends on the capacity of the ball to float in the water.

Ball-floats to which the operating-lever is secured at one side of the ball deteriorate soon by the bucking action of the thin metal of the ball adjacent to the joint. Therefore the lever is preferably extended through the ball. This requires two joints, usually made by soldering the lever into the holes of the ball.

The conditions under which ball-floats are used induce electric action when two kinds of metal are in contact with each other and soon affect the parts adjacent to the joint sufficiently to cause leaks.

The objects of this invention are to prevent these injurious actions on the ball-float and secure greater reliability of the device.

To this end the invention consists in the ball-float with a cup for the reception of the end of the lever and with a non-corrodable joint, as will be more fully set forth hereinafter.

Figure 1 is a side view of my improved ball-float. Fig. 2 is a sectional view of the same. Fig. 3 is an end view of a portion of the ball, partly in section, and the nut securing the lever to the ball as seen from the inside.

In the drawings, $a$ indicates a spheroidal hollow ball, $a'$ a protuberance on one end or pole of the ball $a$, and $a^2$ a hole in the opposite pole of the ball. The protuberance $a'$ is formed by forcing the metal of the ball outward to produce a cup into which the end $b'$ of the lever $b$ may be inserted and held without perforating the ball. The lever $b$ is secured in the hole $a^2$ without the use of solder. The part $b^2$ of the lever $b$ is screw-threaded, and the part $b^3$ is preferably made of less diameter and secured in a socket formed in the end of the main part of the lever $b$. The clamp-piece $b^4$ is inserted through the hole $a^2$ and held in place. The part $b^2$ is inserted through the screw-threaded hole in the clamp-piece, and the lever is turned until the end $b'$ is supported in the protuberance $a'$ and the clamp-piece $b^4$ bears against the inner surface of the ball $a$. A gasket $b^5$, of rubber or other elastic material, is placed over the hole $a^2$ and is compressed by screwing the flanged nut $b^6$ against the gasket $b^5$, thereby making an air and water tight joint. The ball, the lever, the clamp-piece, and the nut $b^6$ are designed to be made all of the same metal, so that no electric or other injurious action can take place.

Having thus described my invention, I claim as new and desire to secure by Letters Patent—

1. In a ball-float, a ball having a cup-shaped protuberance on one side and an opening on the opposite side for the reception of the operating-lever, as described.

2. In a ball-float, a seamless ball made from one piece of metal, having a cup-shaped protuberance on one side and an opening on the opposite side for the reception of the operating-lever, as described.

3. In a ball-float, the combination with a ball provided with a cup on one side and an opening on the opposite side, of a lever extending through the opening in the ball and supported in the cup, and a packed joint for securing the lever to the ball and closing the opening, as described.

4. In a ball-float, the combination with the hollow ball $a$, the protuberance $a'$ and the opening $a^2$, of the lever $b$, the screw-threaded part $b^2$, the clamp-piece $b^4$, the non-metallic gasket $b^5$ and the flanged nut $b^6$, as described.

5. In a ball-float, the combination with the lever $b$, the part $b^3$ of less diameter, the screw-threaded part $b^2$ of the lever, the clamp-piece $b^4$ and the flanged nut $b^6$, of the hollow ball $a$, the protuberance $a'$, the hole $a^2$ in the ball, and an elastic packing clamped over the hole in the ball, as described.

In testimony whereof I have signed my name to this specification in the presence of two subscribing witnesses.

JOSEPH P. BURLINGAME.

Witnesses:
 B. S. WEBSTER,
 JOS. A. MILLER, Jr.